(12) United States Patent
Dansui et al.

(10) Patent No.: US 7,147,676 B2
(45) Date of Patent: Dec. 12, 2006

(54) METHOD OF PREPARING A NICKEL POSITIVE ELECTRODE ACTIVE MATERIAL

(75) Inventors: Yoshitaka Dansui, Fujisawa (JP); Tatsuhiko Suzuki, Kamakura (JP); Hideki Kasahara, Naka-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/296,508

(22) Filed: Dec. 8, 2005

(65) Prior Publication Data

US 2006/0088764 A1    Apr. 27, 2006

Related U.S. Application Data

(62) Division of application No. 09/805,509, filed on Mar. 14, 2001.

(30) Foreign Application Priority Data

Mar. 28, 2000   (JP)   ............................. 2000-087999

(51) Int. Cl.
*H01M 6/00*   (2006.01)
*H01M 4/32*   (2006.01)
*H01M 4/52*   (2006.01)
*H01M 4/02*   (2006.01)

(52) U.S. Cl. ...................... 29/623.1; 429/209; 429/223

(58) Field of Classification Search ..................... None
See application file for complete search history.

(56) References Cited

U.S. PATENT DOCUMENTS 6,136,473 A * 10/2000 Furukawa et al. ....... 429/218.2
6,576,368 B1 * 6/2003 Ogasawara et al. ......... 429/223

FOREIGN PATENT DOCUMENTS

| EP | 0794584 A1 | 9/1997 |
|----|-----------|--------|
| EP | 0996182 A1 | 4/2000 |
| JP | 5036935 | 4/1975 |
| JP | 8148145 | 6/1996 |
| JP | 973900 | 3/1997 |
| JP | 992279 | 4/1997 |
| JP | 1021905 | 1/1998 |
| JP | 2000133259 | 5/2000 |

* cited by examiner

*Primary Examiner*—Patrick Joseph Ryan
*Assistant Examiner*—Robert Hodge
(74) *Attorney, Agent, or Firm*—Stevens, Davis, Miller & Mosher, LLP

(57) ABSTRACT

A nickel metal hydride storage battery having an excellent charging efficiency at high temperatures is provided by using a positive electrode comprising nickel hydroxide particles and at least one rare earth compound obtainable by treating a rare earth oxide with an aqueous alkaline solution and an oxidizing agent.

10 Claims, 2 Drawing Sheets

METHOD OF PREPARING A NICKEL POSITIVE ELECTRODE ACTIVE MATERIAL

This is a divisional of application Ser. No. 09/805,509 filed Mar. 14, 2001.

BACKGROUND OF THE INVENTION

1. Field of the Invention

The present invention relates to a positive electrode active material that can be used in an alkaline storage battery and a nickel metal hydride storage battery.

2. Description of Related Art

With the recent spread of portable devices, alkaline storage batteries are demanded to have higher capacity. Particularly, nickel metal hydride storage batteries are secondary batteries, which comprise positive electrodes mainly composed of nickel hydroxide and negative electrodes mainly composed of a hydrogen-absorbing alloy, have spread as secondary batteries of high capacity and high reliability.

Conventional positive electrodes for alkaline storage batteries will be explained below.

The positive electrodes for alkaline storage batteries are roughly classified into two types that are sintered and unsintered. The former type of positive electrode is prepared by sintering a core material such as a punching metal and a nickel powder to obtain a nickel sintered substrate having a porosity of about 80%, impregnating the resulting substrate with an aqueous solution of a nickel salt such as aqueous nickel nitrate solution and then dipping the substrate in an aqueous alkaline solution, thereby to produce nickel hydroxide in the porous nickel sintered substrate. The positive electrode thus produced has a limited substrate porosity, which makes it difficult to increase the porosity. It is thus impossible to increase the content of the active material to fill in. This difficulty was a limit of conventional storage batteries in improving their capacity.

The latter positive electrodes are those disclosed in, e.g., JP-A-50-36935, which are obtained by filling nickel hydroxide as an active material in a sponge-like three-dimensionally continuous nickel metal-made porous substrate having a porosity of 95% or more. This type has now been widely used for secondary batteries as positive electrodes of high capacity.

For the unsintered positive electrodes of the latter type, it was proposed to fill spherical nickel hydroxide particles in a porous substrate, in terms of the demanded higher capacity. More specifically, the unsintered positive electrodes are obtained by filling spherical nickel hydroxide particles having a particle diameter of several to several tens µm in the porous part (a pore size of approximately 200 to 500 µm) of the sponge-like porous substrate.

Nickel hydroxide particles, which are located around the skeleton of the nickel metal, maintain a conductive network so that charging/discharging response proceeds smoothly. However, the response of nickel hydroxide particles, which are apart from the skeleton, is not satisfactorily smooth.

In order to improve a utilization ratio of the filled nickel hydroxide in the unsintered positive electrodes, a conductive agent is employed in addition to nickel hydroxide as an active material, whereby the spherical nickel hydroxide particles are electrically connected with each other.

Cobalt compounds such as cobalt hydroxide and cobalt monoxide, metallic cobalt, metallic nickel and the like are used as the conductive agent. Thus, it becomes possible to fill the active material at a high density in unsintered type positive electrodes, and the capacity can be increased as compared with the sintered type positive electrodes.

Furthermore, JP-A 8-148145 discloses a method for producing an active material of a positive electrode for high capacity nickel metal hydride storage batteries that are excellent in overdischarge characteristics and meet the market demand for improvement of cycle characteristics, which comprises coating a cobalt compound on an active material nickel hydroxide and subjecting the cobalt compound to an alkali oxidation treatment to convert the compound to a higher order cobalt oxide. JP-A 9-73900 discloses an improvement of the above method.

According to these methods, the nickel hydroxide powders coated with the cobalt compound are sprayed with an aqueous alkaline solution under fluidization or dispersion in the heated air. As a result, it has become possible to make alkaline storage batteries of high energy density, which are improved in utilization ratio of an active material and battery characteristics such as high rate discharge characteristics as compared with the conventional methods in which the cobalt compound is added as an external additive.

Moreover, in alkaline storage batteries, a phenomenon of reduction of charging efficiency occurs when a temperature of the batteries is high. For solving this problem, the electrolyte used in nickel metal hydride storage batteries is optimized. Further, calcium compounds or rare earth oxides such as yttrium oxide and ytterbium oxide that improve the high-temperature charging efficiency are added to positive electrode active materials. This is disclosed, for example, in JP-A-9-92279.

BRIEF SUMMARY OF THE INVENTION

However, even though such conventional additives are added to positive electrodes in an increased amount to enhance the capacity and improve the high-temperature charging efficiency, it is difficult to improve the charging efficiency any further.

Therefore, in light of the foregoing, problems, the main object of the present invention is to provide a nickel metal hydride storage battery having an improved charging efficiency at high temperatures even in a smaller amount of an additive that will be attained through activation of the additive.

To achieve the foregoing object, the present invention provides a nickel metal hydride storage battery that uses a positive electrode comprising an active material containing nickel hydroxide particles and at least one rare earth compound obtainable by treating a rare earth oxide with an aqueous alkaline solution and an oxidizing agent.

Other objects and advantages of the present invention shall become more apparent from the following description of the invention.

DETAILED DESCRIPTION OF THE INVENTION

Figure 1:
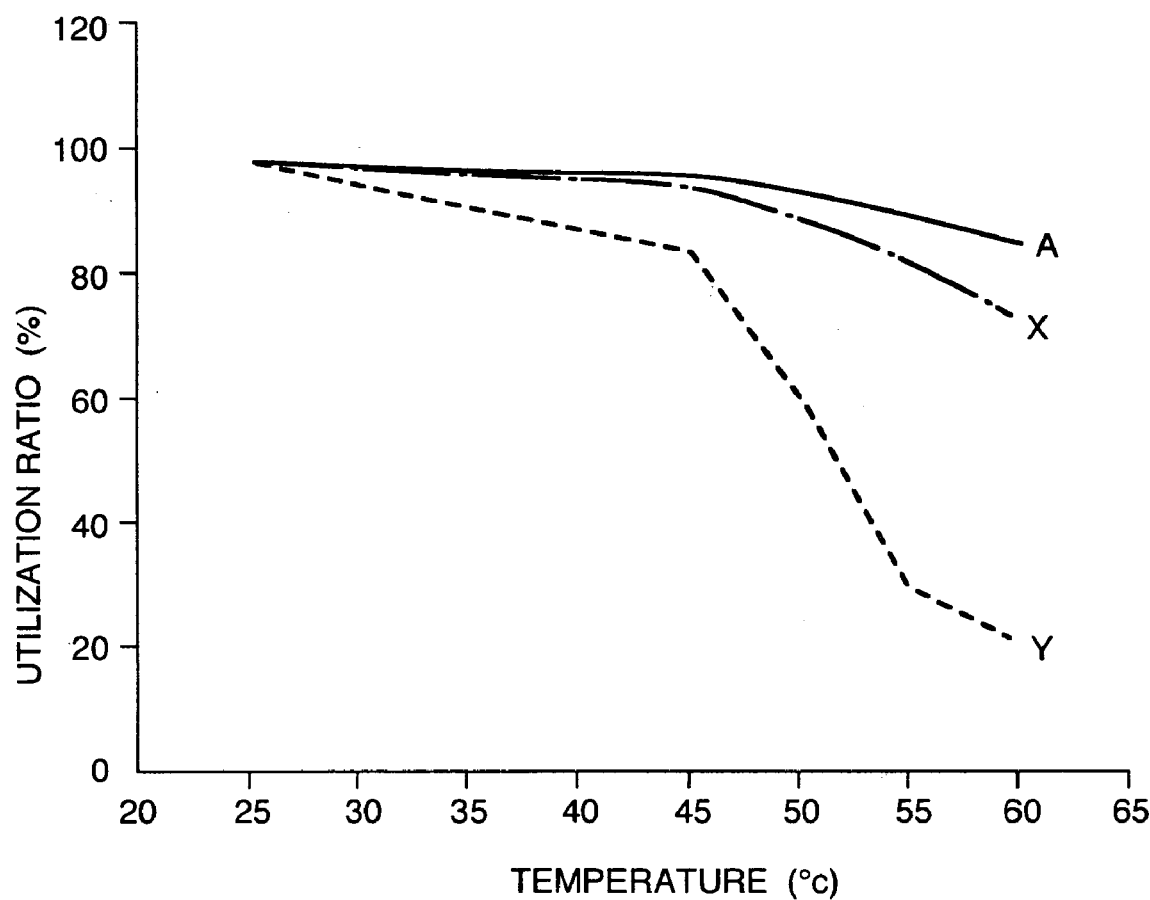
FIG. 1 is a graph which shows a relation between the temperature of the battery and the utilization ratio in Example 1.

The present invention relates to a nickel positive electrode active material comprising nickel hydroxide particles and at least one rare earth compound obtainable by treating a rare earth oxide with an aqueous alkaline solution and an oxidizing agent.

The rare earth oxide is activated by treating with an aqueous alkaline solution and an oxidizing agent. By using this activated rare earth compound, the discharging efficiency at high temperatures can be improved even in a smaller amount of the additive.

The rare earth oxide is typically represented by formula $M_2O_3$, wherein M is a rare earth element. The rare earth oxide include the oxides of scandium, yttrium, promethium, gadolinium, terbium, dysprosium, holmium, erbium, thulium, ytterbium and lutetium, preferably the oxides of yttrium, lutetium, ytterbium, holmium, erbium and thulium, more preferably, the oxides of yttrium, lutetium and ytterbium. These oxides may also be used in an appropriate combination.

The aqueous alkaline solution is preferably an aqueous solution containing at least one member selected from lithium hydroxide, sodium hydroxide and potassium hydroxide.

Preferably, the oxidizing agent contains at least one of an aqueous sodium hypochlorite solution and an aqueous potassium hypochlorite solution.

The rare earth compound is added preferably in a total amount of 0.1 to 4.0% by weight based on the nickel hydroxide particles.

When two or more members of the rare earth compound are employed, for instance, when yttrium and lutetium compounds are used in combination, the amount of each compound preferably meets $50 \geq X \geq 5$, when the weights of yttrium and lutetium compounds are (100–X)% by weight and X % by weight, respectively.

Further when, e.g., ytterbium and lutetium compounds are used, the amount of each compound preferably meets $50 \geq X \geq 5$, when the weights of ytterbium and lutetium compounds are (100–X)% by weight and X % by weight, respectively.

The present invention further relates to a nickel metal hydride storage battery comprising a positive electrode containing nickel hydroxide particles and the additives described above, a negative electrode mainly composed of a hydrogen-absorbing alloy and a separator. The nickel hydroxide particles, hydrogen-absorbing alloys and separators have no particular limitation to their constituents and hence, any materials known in the art may be used. As the nickel hydroxide particles, there may be used, e.g., nickel hydroxide solid solution particles in which metal ions such as cobalt, zinc or cadmium ions or the like are dissolved to form a solid solution and if necessary and desired, a cobalt compound such as cobalt hydroxide or cobalt monoxide, metallic cobalt, metallic nickel, etc. may also added as a conductive agent.

While the present invention is not limited to any theory or mechanism, the inventors presume as follows.

According to JP-A 9-92279, rare earth oxides are used as additives to positive electrodes. The rare earth oxides added that enters into a battery are converted into the hydroxides but some are dissolved in an electrolyte though it is in a trace amount. In this reaction, $H_2O$ in the electrolyte is consumed. The charging efficiency of the battery is dependent on a concentration of the electrolyte. When the electrolyte concentration becomes higher, the charging efficiency decreases. The consumption of $H_2O$ in the electrolyte inside the battery results in increasing the electrolyte concentration in the battery, which might reduce the charging efficiency. Therefore, according to the present invention, the rare earth oxide is previously treated outside the battery.

In addition, by treating the rare earth oxide with the aqueous alkaline solution and the oxidizing agent outside the battery, it is assumed that the rare earth oxide would form a rare earth hydroxide precursor having a higher activity. Rare earth hydroxides are highly crystalline, whereas the rare earth hydroxide precursors used in the present invention have disordered crystalline structures compared with those of the rare earth hydroxides. The rare earth hydroxide precursors are considered to be be coordinated with an alkali or water molecule. It is thus likely that such precursors would possess a larger number of active sites at the interface with the electrolyte compared with the rare earth hydroxides.

Therefore, according to the present invention, a rare earth hydroxide precursor, preferably, an yttrium hydroxide precursor, a lutetium hydroxide precursor or an ytterbium hydroxide precursor is employed as an additive. In the specification, the term "rare earth hydroxide precursor" is used to mean a rare earth compound that is obtained by treating a rare earth oxide with the aqueous alkaline solution and the oxidizing agent. The precursor may also contain unreacted rare earth oxides or rare earth hydroxides in such an amount that does not impair the objects of the invention.

It is assumed that the rare hydroxide precursors would be distinguishable from the rare earth hydroxide and the rare earth oxide, for example, based on the change of the weights. The oxide does not change its weight so much by heating up to about 400° C., but the hydroxide changes its weight around 200° C. to 300° C., since the hydroxide alters to the oxide at the temperatures. The precursor would show the weight change around 100° C., because of the elimination of the physical absorbed water at about 100° C. and the elimination of the crystallization water over 100° C.

Having thus generally described the present invention, the following specific examples are provided to illustrate the invention. The examples are not intended to limit the scope of the invention in any way.

EXAMPLES

Example 1

After 5 g of yttrium oxide was added to 200 cm$^3$ of 30 wt % aqueous sodium hydroxide solution, the mixture was stirred. In the resulting suspension was gradually added 100 cm$^3$ of 20% aqueous sodium hypochlorite solution. After bubbling of oxygen was completed, the solution was filtered and the precipitate was washed with water. The precipitate was dried with a vacuum drier to give yttrium hydroxide precursor.

Next, 300 g of nickel hydroxide powders, 30 g of cobalt hydroxide powders, 6 g of zinc oxide and 3 g of the powders obtained by the above procedure were mixed to prepare a paste. A foamed metal was filled with the paste, followed by drying and rolling to make a positive electrode plate. After rolling, the positive electrode plate had a thickness of about 750 μm. A theoretical capacity of the electrode was 1300 mAh (the theoretical capacity was calculated based on nickel hydroxide as having 289 mAh/g assuming that nickel hydroxide causes one electron reaction).

Then, a paste for a negative electrode was prepared by mixing a hydrogen-absorbing alloy of AB$_5$ type with 1 wt % of a carbon material, 1 wt % of PTFE and water. The paste was coated on a foamed metal, followed by drying and rolling. A thickness of the negative electrode thus prepared was 420 µm after rolling. The electrode had a theoretical capacity of 1900 mAh.

As a separator, nonwoven fabric made of polypropylene was used. A thickness of the separator was 130 µm.

These positive and negative electrodes and the separator described above were disposed in the order of positive electrode-separator-negative electrode-separator. The entire system was rolled in a spiral form and encased in a battery case of A4 size. The case was filled with a given volume of an alkali electrolyte solution. Thereafter, the case was sealed at the upper part with a sealing plate to make a sealed type nickel metal hydride storage battery.

The battery was charged at 130 mA in the atmosphere of 25° C. for 15 hours and then discharged at 260 mA until discharge voltage reached 1 V. A utilization ratio (the ratio of actual discharge capacity/theoretical capacity of positive electrode, which is shown in percentage) determined from the discharge capacity under the given conditions was 98%. This battery is referred to as battery A of the present invention in Example 1.

For comparison, two types of batteries were prepared.

One battery for comparison was prepared in a manner similar to Example 1 except that yttrium oxide was used without any treatment, in place of the yttrium hydroxide precursor obtained in Example 1 by treating yttrium oxide with the aqueous alkaline solution and the oxidizing agent. This battery is referred to as battery X.

Another battery for comparison was prepared using a positive electrode to which no yttrium oxide was added. This battery is referred to as battery Y. The batteries X and Y showed a utilization rate of 98%, respectively, in the atmosphere of 25° C.

Next, these batteries were charged at 130 mA in the atmospheres of 25° C., 45° C., 50° C., 55° C. and 60° C., respectively. The temperature was then lowered to 25° C. and the batteries were discharged at 260 mA.

FIG. 1 shows a utilization ratio at each temperature, in which solid line, chain line and dotted line designate utilization ratios of battery A and batteries X and Y for comparison, respectively.

As is clear from FIG. 1, in the battery of the present invention, the charging efficiency increased more at elevated temperatures, as compared to the batteries to which known yttrium oxide was added.

Example 2

Positive electrodes to which the yttrium hydroxide precursor powders prepared as in Example 1 were added in the amounts of 0.1, 0.2, 0.5, 1.0, 1.5, 2.0, 3.0, 4.0 and 5.0 wt % were made and nickel metal hydride storage batteries of A4 size were fabricated as in Example 1.

Figure 2:
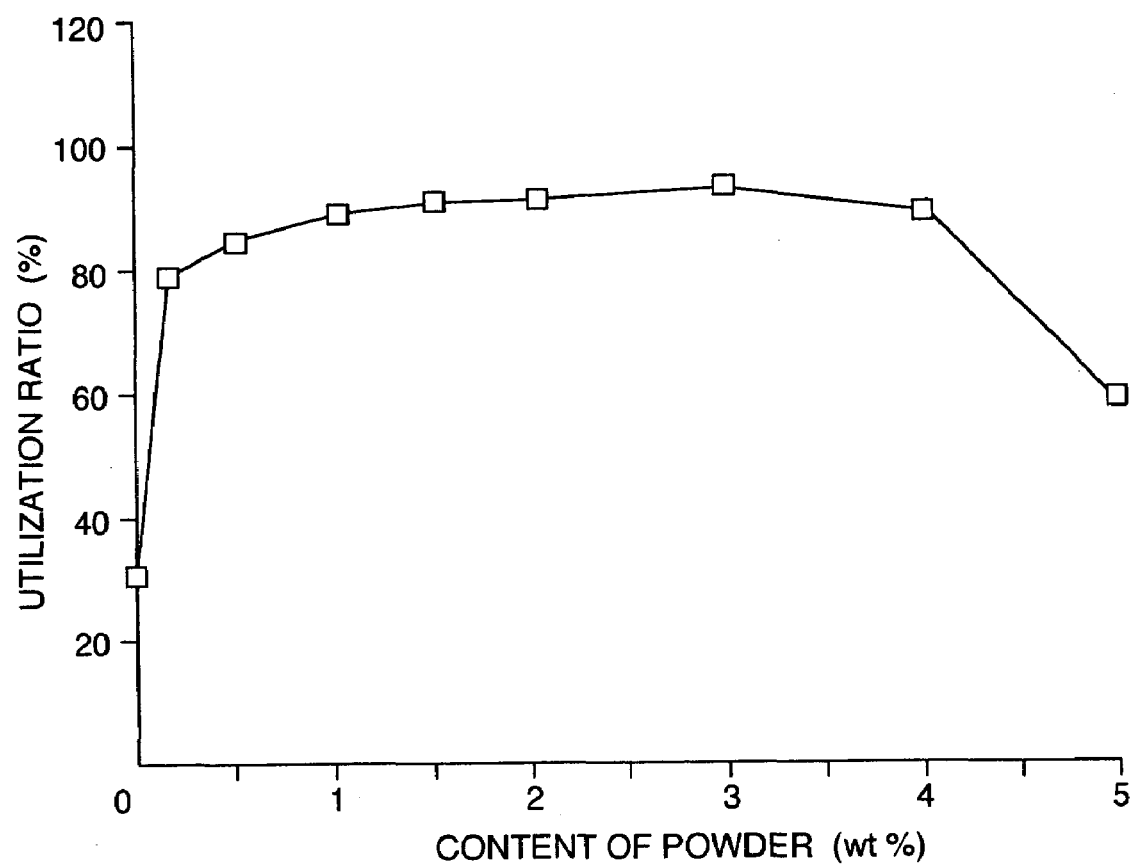
FIG. 2 is a graph which shows a relation between the content of powders and the utilization ratio in Example 2.

These batteries were charged at 130 mA in an atmosphere of 55° C., and then the temperature was lowered to 25° C. The batteries were then discharged at 260 mA. The utilization ratio in this case is shown in FIG. 2. As is clear from FIG. 2, the optimum range for the amount of the precursor added to improve the charging efficiency is noted and a preferred range is found to be 0.1 to 4.0 wt %.

Example 3

Five grams of yttrium oxide and 5 g of lutetium oxide were added to 300 cm$^3$ of 30 wt % aqueous sodium hydroxide solution followed by stirring. In the resulting suspension was gradually added 200 cm$^3$ of 20% aqueous sodium hypochlorite solution. After bubbling of oxygen was completed, the solution was filtered and the precipitate was washed with water. The precipitate was treated in the same manner as in Example 1 to prepare a battery added with 2 wt % of the precursor thus obtained. A utilization ratio of the battery at 55° C. was 92%. A similar effect was obtained even when the precursor was mixed in 50:50.

In the Examples above, the powders obtained by treating yttrium oxide and lutetium oxide with the aqueous alkaline solution and the oxidizing agent were used but similar effects can be obtained also with ytterbium oxide.

In the Examples described above, sodium hydroxide was used as the aqueous alkaline solution but for this purpose, lithium hydroxide and potassium hydroxide can be used singly or by mixing them.

In the Examples described above, sodium hypochlorite was used as the oxidizing agent but similar effects can also be obtained when potassium hypochlorite is employed.

The effects described above are considered to be obtained by treating yttrium oxide, ytterbium oxide and/or lutetium oxide with the aqueous alkaline solution and the oxidizing agent. Even when the other impurities, e.g., rare earth oxides, transition metal oxides, alkaline earth elements, etc. are contained, these impurities do not adversely affect the effects of the invention.

The addition of cobalt oxide or zinc oxide used in the Examples above should not be deemed to limit the invention but is merely given by way of examples.

As described above, the nickel metal hydride storage battery using the positive electrode of the invention which is added with the rare earth compound treated with the aqueous alkaline solution and the oxidizing agent provides markedly improved efficiencies especially at high temperatures, resulting in an immensely valuable industrial utility.

What is claimed is:

1. A method of preparing a nickel positive electrode active material comprising the steps of:
   (a) forming a rare earth hydroxide precursor by activating a rare earth oxide comprising treating a material consisting essentially of the rare earth oxide with an aqueous alkaline solution and an oxidizing agent; and thereafter,
   (b) forming a material by adding nickel hydroxide particles to the rare earth hydroxide precursor, the material being essentially free of rare earth oxide and oxidizing agent, whereby the nickel hydroxide particles are not oxidized.

2. A method according to claim 1, wherein the rare earth compound is at least one selected from the group consisting of: (a) a yttrium compound having characteristics produced by treating yttrium oxide with an aqueous alkaline solution and an oxidizing agent, (b) a lutetium compound having characteristics produced by treating lutetium oxide with an aqueous alkaline solution and an oxidizing agent, and (c) a ytterbium compound having characteristics produced by treating ytterbium oxide with an aqueous alkaline solution and an oxidizing agent.

3. A method according to claim 1, wherein a total amount of the rare earth compound is in the range of 0.1 to 4.0 wt % based on the nickel hydroxide particles.

4. A method according to claim 2, wherein the rare earth compound is a combination of the yttrium compound and the lutetium compound, wherein the two compounds satisfy the relation $50 \geq X \geq 5$, when weights of the yttrium compound and the lutetium compound are $(100-X)\%$ by weight and $X\%$ by weight, respectively.

5. A method according to claim 2, wherein the rare earth compound is a combination of the ytterbium compound and the lutetium compound, wherein the two compounds satisfy the relation $50 \geq X \geq 5$, when weights of the ytterbium compound and the lutetium compound are $(100-X)\%$ by weight and $X\%$ by weight, respectively.

6. A method according to claim 1, wherein the aqueous alkaline solution is an aqueous solution containing at least one selected from the group consisting of lithium hydroxide, sodium hydroxide and potassium hydroxide.

7. A method according to claim 1, wherein the oxidizing agent contains at least one selected from the group consisting of an aqueous sodium hypochlorite solution and an aqueous potassium hypochlorite solution.

8. A method according to claim 1, wherein the produced mixture is employed in production of a nickel positive electrode.

9. A method according to claim 1, wherein the produced mixture is employed in production of a nickel metal hydride storage battery.

10. A method of forming a battery comprising: combining the nickel positive electrode active material prepared according to the method of claim 9 with a negative electrode and a separator.

* * * * *